Feb. 11, 1964 J. SHUSTER 3,120,763
TRANSMISSION CONTROL SYSTEMS
Filed March 29, 1961 5 Sheets-Sheet 1
Fig. 1
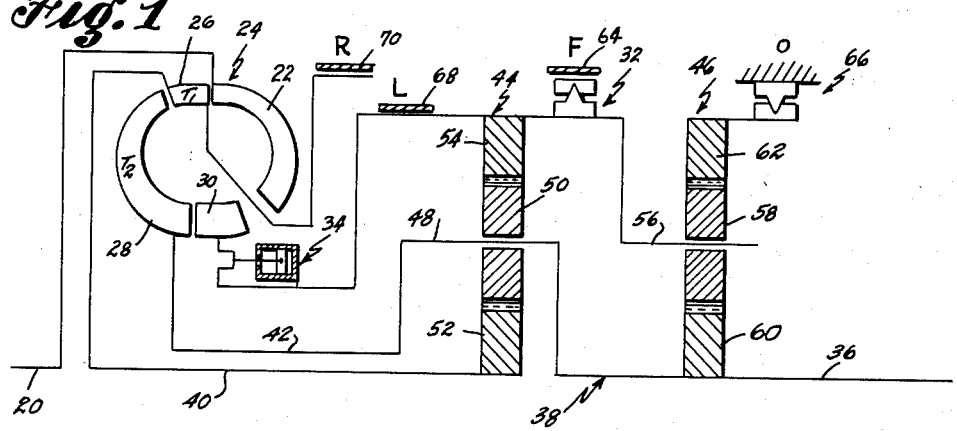
Fig. 2
| | TORQUE CONVERTER | ENGAGED ELEMENTS | | | | DRIVE RATIO |
|---|---|---|---|---|---|---|
| | | F | L | O | R | |
| LOW | MULTIPLYING | X | | | | $T_1 \times (1 + o/s)$ |
| INTERMEDIATE | " | | | | | $T_2$ |
| DIRECT | COUPLING | | | | | $1:1$ |
| OVERDRIVE | " | | | X | | $T_2 \times [1 \div (1 + o/s)]$ |
| EMERGENCY LOW | MULTIPLYING | | X | | | $T_1 \times (1 + o/s)$ |
| REVERSE | " | | | | X | $T_2 \times (1 + s/o)$ |
Fig. 3
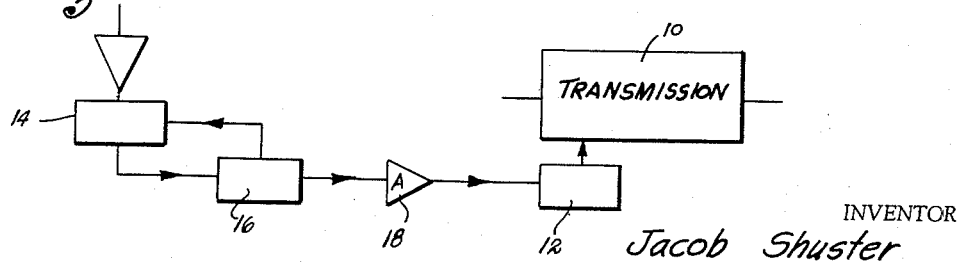
INVENTOR
Jacob Shuster Feb. 11, 1964   J. SHUSTER   3,120,763
TRANSMISSION CONTROL SYSTEMS
Filed March 29, 1961   5 Sheets-Sheet 4

INVENTOR
Jacob Shuster

Feb. 11, 1964 J. SHUSTER 3,120,763
TRANSMISSION CONTROL SYSTEMS
Filed March 29, 1961 5 Sheets-Sheet 5

INVENTOR
Jacob Shuster

United States Patent Office 3,120,763
Patented Feb. 11, 1964

3,120,763
TRANSMISSION CONTROL SYSTEMS
Jacob Shuster, 1904 Reedie Drive, Silver Spring, Md.
Filed Mar. 29, 1961, Ser. No. 99,177
17 Claims. (Cl. 74—472)

This invention relates to automatic transmissions for automotive vehicles, and in particular to control of the transmissions in accordance with safety conditions prescribed for a particular highway.

In order to better appreciate the area to which the vehicle safety influences are directed pursuant to this invention, an understanding of automatic transmissions, in general, will be helpful.

Automatic transmissions have, in common, a drive arrangement controlled by operation of servo mechanisms energized by a control medium affected by various condition signals.

The drive arrangement of most commercial transmissions include positive gearing and a fluid transmitter. Transmissions differ widely from each other, however, in the particular gear train arrangement, type of fluid transmitter and the drive relationships therebetween. Basically, the fluid transmitter provides the "yieldability" in the power train and in the case of the torque converter type of fluid transmitter torque multiplication is also provided. As a further function, the fluid torque converter may also serve to provide a torque load responsive variation in the overall drive ratio. Another variation in the drive arrangement resides in the drive relationship of the fluid transmitter to the gearing involving both series and parallel drive connections therebetween. Some torque converters include a plurality of output turbine elements in addition to the impeller and reactor elements making available many possible drive connections.

Modern automatic transmissions utilize planetary-type gearing for the simple reason that it requires less effort to change the ratio by engagement of control brakes or clutches than the bodily movement of gears as in the slideable gear transmissions. Also, a greater number of gear train and ratio variations and flexibility in general is characteristic of planetary gearing as distinguished from all other gearing. The planetary gearing may provide a positive drive ratio therethrough which changes in steps by selective application of different control brakes or clutches or infinitely varied by its use in a split drive arrangement or by variable clutch or brake control.

In transmissions employing clutches and brakes for rendering various planetary gear trains effective, engaging mechanisms or servos are required for each clutch or brake. Depending on the drive arrangement the servo requirements will vary. The number of servos to be operated will vary with different planetary gear arrangements; some will require the simultaneous engagement of two engaging devices to render a drive train effective and others only one. It may be desired to provide "anticreep" braking by simultaneous engagement of two engaging devices to brake the whole transmission; it may be desired to engage a stand-by two-way engaging device for coast braking purposes wherein a releasable, one-way drive engaging device is otherwise engaged. The servos themselves may be either of the hydraulic or electrical type. The electrical servos are generally of the solenoid or electromagnetic type, whereas the hydraulic servos are of the piston type. The hydraulic servo may be fluid engaged and spring released or spring engaged and fluid released; it may have a fluid apply chamber or both an apply and a disapply fluid chamber (double-acting piston type). The servo piston may have plural surfaces subject to different and/or variable pressures if it is desired to vary the engaging force of the control device. Overlap in the simultaneous engagement and disengagement of different servos may be desired in the transition or during the change in gear ratio. A hydraulic interlock may be provided to prevent undesired engagement of one servo when certain others are still engaged.

It will therefore be evident that the control circuit for effecting servo operation will vary as to complexity depending upon the problems created in the type of drive arrangement and the number and nature of the control influences to be utilized.

Aside from purely mechanical connections, the control circuit system for automatically effecting sequential servo operations with the desired degree of force, overlap and response, requires some transmitting medium. In the case of most domestic automatic transmissions, hydraulic fluid or oil is used exclusively. Electricity has been also proposed and used in some foreign transmissions. However, the hydraulic medium has been found to be most satisfactory because of the reliability and endurance of the structure for generating pressure, and handling and directing the medium. In the case of hydraulic fluid (oil) the common pressure generating practice has been to utilize an engine driven pump of fixed or variable capacity for providing the circuit conduits with the requisite pressure. Also, a vehicle driven pump is often used in conjunction with the circuit for supplying the pressure and simultaneously unloading the engine pump at such time when the vehicle speed is high enough to generate the requisite pressure. A system of check valves and dump valves or mechanical disconnect mechanisms are therefore provided to perform the engine pump unloading function. It will therefore be appreciated that the pressure generators are designed to provide the maximum pressure for the control system that may be utilized at any point or time. Accordingly, pressure regulators are provided at various points in the control system to reduce the pressure from the pressure generator to a useable or required value. Often a regulator is placed adjacent the pumps to limit the pump output pressure to some predetermined maximum value for the system, while other regulators may be placed throughout the system to further reduce pressure at certain points and times as required. For example it may be desirable to reduce servo pressure at higher speeds; it may be desired at times to change the range and response of a pressure signal. Also, further control over the fluid medium is exercized by flow rate control. The use of control orifices therefore is common in order to provide delays in pressure response as for example during ratio change transition periods. The foregoing is indicative therefore of the manner in which the fluid medium is handled in order to perform the automatic functions. Other mediums such as electricity are obviously handled in analogous if not an equivalent manner. It should be realized of course that different mediums have different problems requiring different handling. In the case of electricity, it would appear that a more complex and greater degree of control may be called for to deal with instability, response time, etc.

For successful operation of the control systems referred to above in automatically controlling the transmission, the proper signals must be provided. Accordingly, the signals chosen have been those previously felt or sensed by the driver, such as accelerator position and vehicle speed. These signals have therefore been applied through the transmitting medium. The signals have been used to shift fluid directing valves and vary the regulatory influence of pressure regulators and flow control mechanisms. More recently other signals have been introduced or proposed either to supplement or replace the previous signals. Such other signals include manifold vacuum, engine speed transmission torque, fluid transmitter pressure, atmospheric pressure and acceleration or deceleration. Also, the control systems have been designed to be further influenced by signals of manual origin such as selector range position, brake pedal application and/or position, and accelerator kickdown. These signals have been introduced either independently or as part of a joint influence in order to have the desired effect on the control system.

It will be evident from the foregoing discussion that the present invention involves the recognition that automatic control over automotive transmissions, in general, presents an ideal area into which externally generated control signals may be introduced in order to exercise a restraining safety influence on the automotive vehicle. The only known influences external to the vehicle heretofore proposed has been atmospheric pressure and temperature. However, these latter influences are of natural origin rather than a purposely generated signal influence. It is also recognized that the use of generated electromagnetic wave energy and magnetic fields have heretofore been proposed in connection with automotive vehicle operation, but such proposals have been directed toward the complete guidance of the vehicle by replacing human control over such control elements as the brakes, throttle and steering wheel. Equipment for such guidance purposes is however presently impracticable not only because of their installation, but because of the necessary radical modification of the automotive vehicle components. Moreover, such guidance systems would involve complete replacement of the driver's exercised control over the vehicle in order to prevent damage thereto.

By the present invention, however, the modification of the vehicle is restricted to additions to the transmission control system and the installation of an external signal receiver. Furthermore, the driver's control is in no way directly disturbed. Nevertheless a helpful degree of vehicle guidance and a measure of safety is provided. The teachings of the present invention may therefore be put into effect in a more practical manner both from an economic and psychological standpoint and may begin to provide a realistic and practical attach on the death toll of automotive highway accidents which has reached absurd proportions.

In carrying out the concepts of the present invention, the externally generated signal may be made operative to exercise its influence under any desired condition conducive to safer operation of the vehicle. Accordingly, the external influence may be effective above a certain prescribed speed limit for vehicles on a particular road, or rendered operative when a vehicle tends to deviate from its proper lane, or combinations of both. Also, pursuant to the teachings of this invention, the drive ratio of the transmission is reduced in a progressive manner upon reception of the safety signal so as to reduce the vehicle speed to a safer value and also indicate thereby to the driver the dangerous situation. In other words, full response to the driver's control influence will be present only when safe conditions prevail.

Alteration of the ratio control systems of automatic transmissions in accordance with the principles of the present invention involve, therefore, the use of mechanisms for reducing and/or disabling those ratio change influences which tend to increase the vehicle speed and the subsequent use of forced downshifting mechanisms should the vehicle speed remain high. The disabling and forced downshifting mechanisms are accordingly normally ineffective to influence the control functions but become operative when the vehicle speed is excessive and/or the vehicle has deviated from its proper lane on the road.

The following detailed description of some specific proposals pursuant to the principles of the present invention should therefore not be considered restrictive. It will be appreciated that there are numerous operative locations within any one automatic control circuit at which the external safety influences may be introduced. Also, by virtue of the many different types of automatic transmission as heretofore indicated, to which the present invention relates, it would be impracticable to specifically describe all the possible adaptations for automatic transmissions.

In the drawings:

FIGURE 1 is a schematic representation of one-half of a symmetrical longitudinal section of a transmission embodying one form of the invention.

FIGURE 2 is a chart indicating the drive ratio pattern of the transmission illustrated in FIGURE 1.

FIGURE 3 is a diagrammatic representation of a transmission and safety signal arrangement of the present invention.

Figure 4:
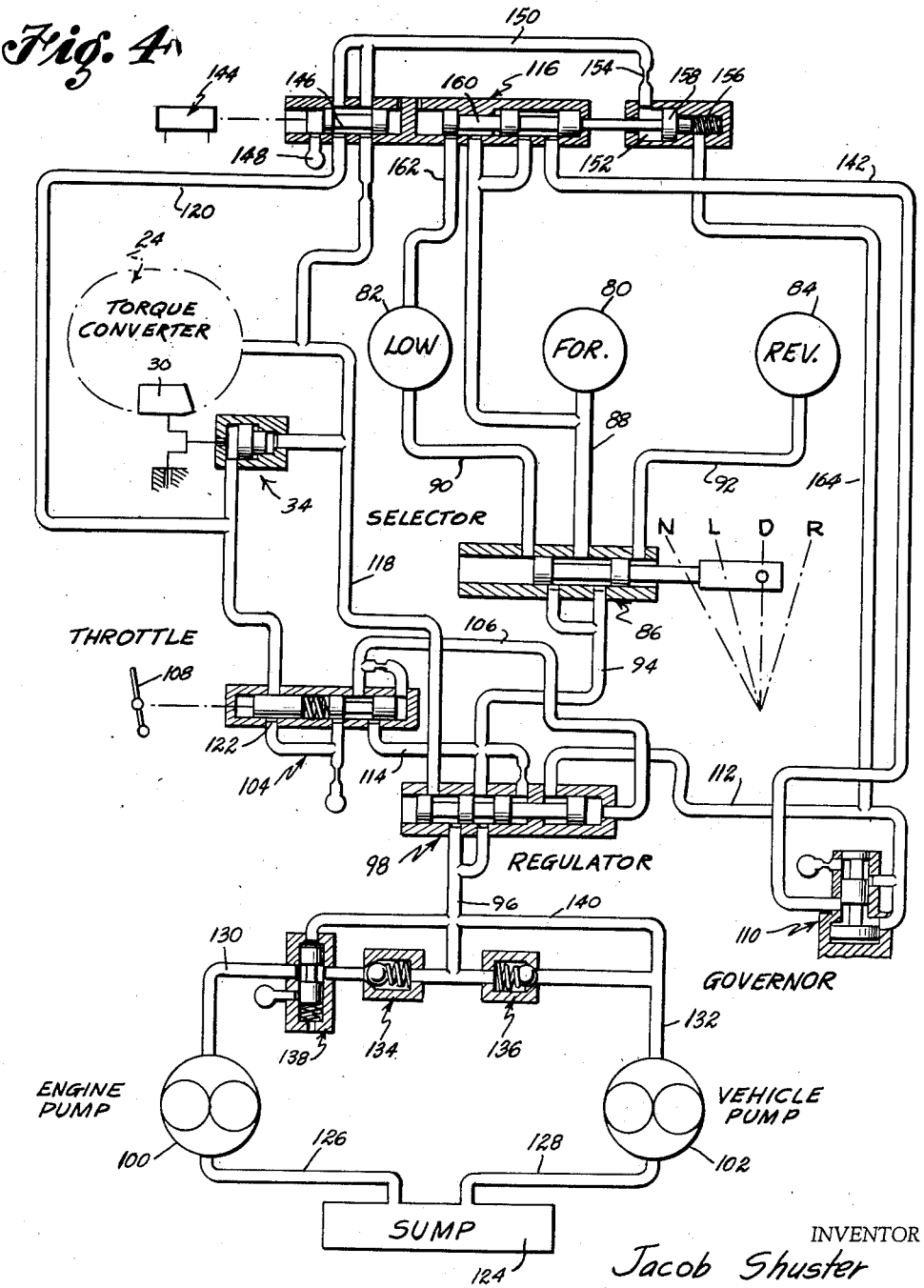
FIGURE 4 is a circuit diagram of one form of hydraulic control system, the transmission embodying safety feature control.

Referring now to the drawings in detail, FIGURE 3 illustrates diagrammatically an arrangement by means of which the invention may be carried out. An automatic transmission 10 of any suitable form as hereinbefore summarized is therefore shown operatively connected to a restraining control unit 12 by means of which the transmission response to drive control is carried. The signal to which the unit 12 responds in order to exercise its restraining influence on the transmission control system is derived from an external signal receiver 14 which may be of any suitable form depending upon the signal transmission medium and the phenomenon issuing the signal. It is accordingly contemplated that the signal transmission medium may include electromagnetic wave energy and/or magnetic field energy for detecting deviations of the vehicle from a prescribed course, overspeeding and/or reflecting proximity to other vehicles. The signal from receiver 14 is therefore fed into a detector and discriminator unit 16 which transmits those signals indicating a dangerous condition to the amplifier 18 for supply to the unit 12. Also, the unit 16 may be operatively connected to the receiver 14 for orientation control thereof for optimum reception of the warning signal.

Although the transmission 10 may take various forms, one exemplary transmission drive arrangement is symbolically illustrated in FIGURE 1, which is particularly suitable for the restraining signal responsive control system of the present invention because of an unusually wide range of automatically varied drive ratios inherent therein. The transmission includes therefore an input shaft 20 which is connected to the impeller element 22 of a hydraulic torque converter generally referred to by reference numeral 24. The torque converter includes a plurality of independently rotatable output turbines 26 and 28 and a stator 30 arranged to form a toroidal fluid flow circuit with the impeller 22 as is well known to those skilled in the art. The stator 30 is prevented from turning in a reverse direction by the releasable one-way brake device 32 in order to effect torque multiplication in transmitting power from the impeller to the turbines. As is known, for any given fluid exit angle of the stator, the output torque ratio for each output turbine will decrease from a maximum starting torque at the stall speed of the converter with increase in the output speed of the transmission. By increasing the exit angle of the stator, a higher starting torque may be obtained. Accordingly, hydraulic servo device 34 is provided for changing the pitch angle of the stator. The servo 34 in one position with therefore position the stator for normal torque ratio operation of the torque converter and will in response to kickdown operation of the vehicle accelerator, position the stator for high starting torque operation. Under either condition of operation, the torque converter will transmit power to output shaft 36 through the positive drive gear arrangement generally referred to by reference numeral 38.

The gearing 38 is therefore drivingly connected to the output turbines 26 and 28 through shafts 40 and 42 respectively and includes a reduction drive planetary gear set 44 and an overdrive planetary gear set 46. The output shaft 36 is connected directly to the second turbine driven shaft 42 by a planet gear carrier 48 of the gear set 44 which rotatably mounts planet pinions 50. The planet pinions mesh with an input sun gear 52 connected to the first turbine driven shaft 40. Also meshing with the planet pinions is a control ring gear 54 which is connected to the stator 30 and to the planet carrier 56 of the gear set 46. The planet pinions 58 rotatably mounted on the carrier 56, mesh with sun gear 60 fixed to the output shaft 36 and with overdrive control ring gear 62.

In order to control both the torque converter operation and condition the gearing for different ratio drives therethrough, a plurality of selectively releasable brake devices are provided. For normal driving purposes, the brake device 64 is engaged so as to render the one-way brake 32 operative to prevent reverse rotation of both the stator 30 and the ring gear 54 so as to condition the torque converter for high starting torque multiplication through turbine 26 as long as the fluid circuit flow therein tends to urge the stator in a reverse direction and also condition the gear set 44 for forward reduced drive therethrough. As the speed of the first turbine 26 and sun gear 52 increases, the second turbine 28 begins to rotate and deliver torque to the carrier 48 until the ring gear 54 is urged to rotate in a forward direction. At the latter condition, the turbine 28 is designed to take over the delivery of all of the torque for directly driving the output shaft 36 at a reduced torque multiplication. The second turbine 28 torque ratio decreases and its speed increases until the coupling stage of the torque converter is approached whereupon the stator 30 begins to rotate forwardly. When the forward rotation of the stator is such as to begin to deliver torque to the carrier 56, it will urge the ring gear 62 in a direction reverse to that in which the ring gear normally idles when the carrier 56 is substantially stationary and the output shaft 36 is driven at same torque multiplication ratio to the input shaft 20 which is prevented by one-way brake 66 so as to condition the gear set 46 for overdrive operation. The output shaft 36 speed will accordingly be increased with any further increase in the speed of the stator and will maintain the turbine 28 rotating faster than the stator. It will therefore be appreciated that with the brake 64 engaged, the gearing 38 is automatically changed from a low ratio drive condition when starting to direct drive and finally to an overdriving condition when cruising.

If it is desired to maintain the transmission in its high torque, low ratio operation occuring under starting conditions, the emergency low, two-way brake 68 is engaged. For reverse drive, the two-way brake 70 is engaged so as to render the first turbine 26 operative as a stator which so redirects the fluid flow as to cause reverse rotation of the turbine 28. Also, the sun gear 52 will be held stationary by the brake 70 so as to condition the gear set 44 for an even lower drive ratio than when the ring gear 54 was held stationary.

Figure 7:
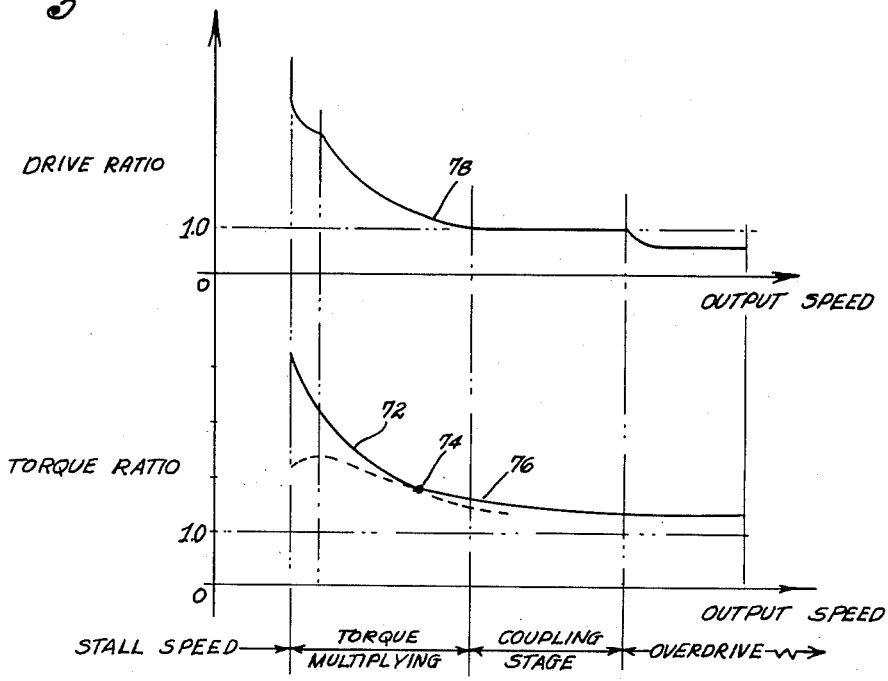
FIGURE 7 is a graphical illustration of transmission performance.

The foregoing description of the drive ratio pattern effected by selective engagement of the brakes 64, 68 and 70 and the automatic engagement of the brake 66 is summarized in the table illustrated in FIGURE 2. Also, attention is invited to FIGURE 7 which graphically depicts the aforementioned normal operation of the transmission. It will be observed therefore in FIGURE 7, that the torque ratio curve 72 for the first turbine 26 decreases to a point 74 as the output speed increases from the converter stall speed at which the second turbine 28 takes over the delivery of torque with a smooth transistion beginning at a reduced torque ratio value. The torque ratio curve for the second turbine 28 is referred to by reference numeral 76, and extends into the coupling and overdrive stages of operation. A wider and smoother torque multiplication range is therefore realized by virtue of the transmission drive arrangement which is also accompanied by progressive and automatic decrease in the reduction gear ratio of the gearing and reduction drive ratio of the transmission as indicated by curve 78. The transmission performance curves will however be considerably restricted from that shown in FIGURE 7 if the brake 68 were engaged and even further restricted when the pitch angle of the stator is established for kickdown start operation. Transmission operation under the latter conditions particularly at higher vehicle speeds would not only effect engine retardation but also be highly inefficient and markedly less sensitive to accelerator control. It will therefore be apparent why the particular wide range transmission of this invention is especially suited for application of externally signalled restraining influences.

The transmission control system for the foregoing drive arrangement as well as for other similar types of drive arrangements wherein the ratio is automatically varied in accordance with plural turbine torque converter operation is shown in FIGURE 4. The control system in FIGURE 4 does not therefore include any automatically operated ratio changing valve mechanism as will be described hereafter with respect to FIGURE 5, but instead includes a forward drive engaging servo 80 which is selectively energized by fluid under pressure to condition the transmission for normal automatic operation. The low drive servo 82 is therefore also provided for restricting transmission operation to the low drive range. Further, the servo 34 is shown operatively connected to the stator 30 of the torque converter 24 for still further restricting transmission operation as hereinbefore indicated. The reverse drive servo 84 is also present. Selective engagement of the forward, low and reverse drive brake devices as described with respect to FIGURE 1, may therefore be effected by driver control of the position of the selector valve mechanism 86 which is hydraulically connected to the servos 80, 82 and 84 by conduits 88, 90 and 92 respectively. Fluid under pressure is therefore supplied to the selector 86 for distribution by the supply conduit 94. The fluid in the supply conduit 94 is derived from conduit 96 after passing through the regulator valve mechanism 98 by means of which the discharge pressure from the engine driven pump 100 or vehicle driven pump 102 may be reduced to the desired pressure level for proper servo operation. The regulator 98 is self-regulating and may also be varied under the joint opposing influence of accelerator position and vehicle speed whereby the pressure level is increased with accelerator depression and reduced with increase in vehicle speed. Accordingly, a throttle valve mechanism 104 is provided for supplying to outlet conduit 106 fluid under pressure varying with the position of accelerator 108 and a governor valve mechanism 110 supplies fluid under pressure to conduit 112 increasing with vehicle speed. The throttle pressure conduit 106 and governor pressure conduit 112 are therefore connected to the regulator 98 for pressure level variation. The supply conduit 94 therefore supplies fluid to the throttle valve 104 by conduit 114, while the conduit 88 pressurized only during automatic operation of the transmission normally supplies fluid to the governor 110 through the conduit 142 and the restraining valve mechanism 116 constituting one of the novel features of the control system to be described hereafter in further detail.

A low pressure line 118 is also connected to the regulator 98 for pressure venting purposes and supplies the fluid chamber within the torque converter 24. It will be observed that the conduit 118 is connected to one side of the servo 34 and is normally connected through the restraining valve mechanism to the conduit 120 which pressurizes the other side of the servo 34 so as to normally position the stator for normal torque converter operation. It will be apparent therefore, that upon kickdown of the accelerator the conduit 120 will be vented to exhaust port 122 so that the servo 34 then positions the stator for high starting torque operation.

The pumps 100 and 102 form part of a fluid pressure supply assembly which includes a sump 124 to which the pump inlet conduits 126 and 128 are connected. The pump discharge conduits 130 and 132 are respectively connected through one-way check valves 134 and 136 to the line conduit 96 for supply of fluid pressure to the control system. Accordingly, supply to the conduit 96 will be from the higher pump discharge. The engine pump 100 will therefore initial supply the fluid pressure until the vehicle pump output exceeds that of the engine pump. An unloader valve mechanism 138 responsive to vehicle pump output pressure via line 140 is therefore provided to relieve the loading of pump 100 when it is ineffective.

From the foregoing description of the control system, automatic drive, low range drive, kickdown high torque drive, and reverse drive operation under driver, throttle position and vehicle speed control, will be apparent. However, in response to the aforementioned external safety signal, the valve actuator mechanism 144 will be energized so as to shift the valve element 146 of the unit 116 to the right as viewed in FIGURE 4. The conduit 120 will then be immediately vented to exhaust 148 without kickdown of the accelerator. Since the vented conduit 120 is connected to conduit 150, a reduction of pressure in chamber 152 is gradually effected through restriction 154. The transmission will accordingly be immediately restrained upon positioning of the stator at its higher torque position by the servo 34, and eventually if the dangerous condition still prevails and the actuator 144 remains energized, the pressure in chamber 152 decreases to a point where spring 156 urges the valve actuating piston 158 to the left so as to shift valve element 160 to the left. When the valve element 160 is so shifted, the conduit 88 otherwise operative to condition the transmission for normal automatic operation, is connected to the conduit 162 to pressurize the servo 82 and thereby restrict transmission operation to its low drive range. At the same time the valve element 160 will disconnect the conduit 88 from the governor supply conduit 142, so as to remove all vehicle speed influence from the control system. It will be appreciated that if the higher torque positioning of stator 30 is not sufficient to restrain transmission operation immediately by itself, the remaining high vehicle speed will exert its influence through the pressure in the conduit 164 connected to the governor conduit 112 so as to augment the pressure of spring 156 and more rapidly shift the valve 160 against the declining pressure in chamber 152.

It will therefore be apparent that the unit 116 will be effective to sequentially restrain the transmission with a rapidity governed by the degree to which the initial restraint is effective and the interval during which the dangerous condition prevails. The restraint in the particular example of FIGURE 4 exerts its influence on the torque converter and selective ratio control devices. It will however be appreciated that other types of transmissions and control systems will require the application of the restraining influence on other facilities.

Figure 5:
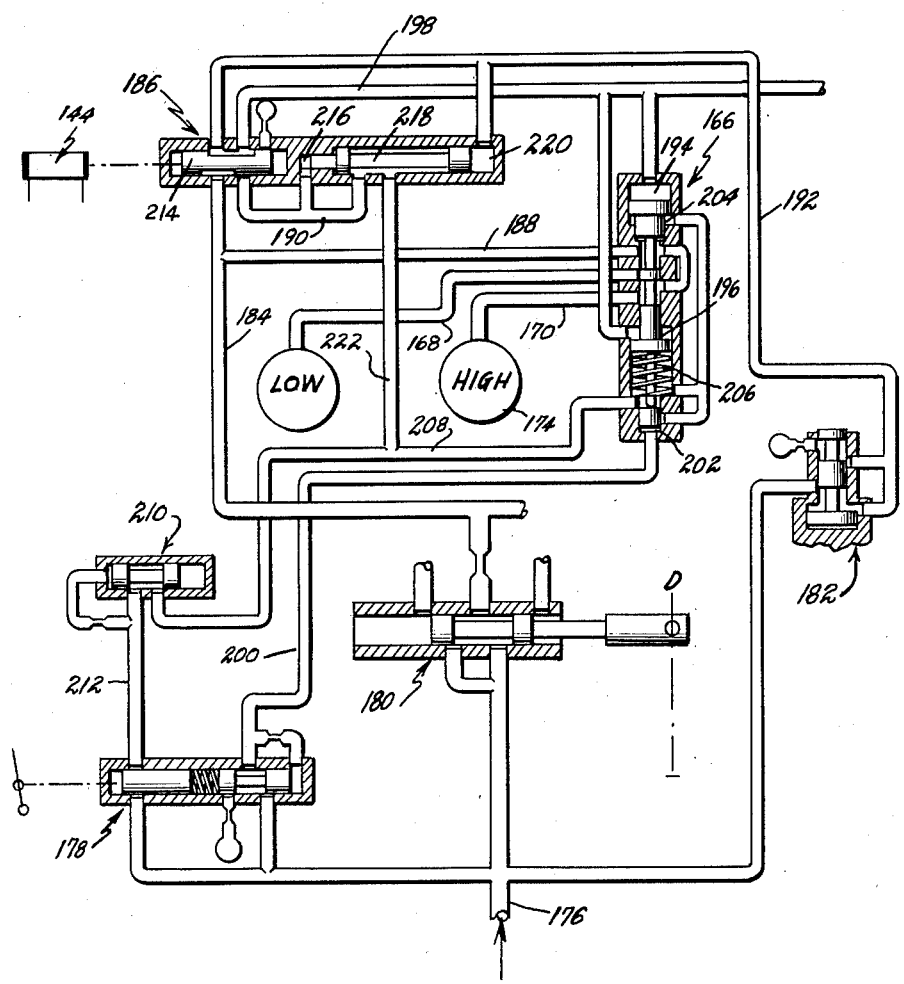
FIGURE 5 is a circuit diagram of another form of hydraulic control system.

Referring therefore to FIGURE 5, a control system is partially illustrated of the type that employs an automatically operative ratio changing distributor valve mechanism 166 through which fluid under pressure may be supplied by conduits 168 and 170 to a relatively low drive ratio servo 172 and a relatively high drive ratio servo 174 respectively. The control system is therefore supplied by a fluid pressure generating assembly such as described with respect to FIGURE 4 connected to the supply conduit 176, to throttle valve 178, selector valve 180 and governor valve 182 which function in a similar capacity as described in connection with FIGURE 4. Under normal drive conditions, the selector 180 connects the conduit 176 to conduit 184 which is connected to the conduit 188. The conduit 188 accordingly supplies the ratio distributor valve 166 which connects conduit 188 to the high servo line 170 in its illustrated upshifted position and to the line 168 in the downshifted position. The governor pressure in line 192 operative urge upshift of all ratio shift valves is therefore normally connected to the governor chambers 194 and 196 by the valve unit 186 and the conduit 198. The throttle pressure on the other hand is supplied by conduit 200 from the throttle valve 178 to the throttle pressure chambers 202, 204 and 206 of the shift valve 166. Forced downshift line pressure is supplied to the chambers 204 and 206 through the conduit 208 which is connected through the downshift pressure cut-off valve 210 to conduit 212 supplied with line pressure upon downshift of the throttle valve. Normal automatic operation of the control system in accordance with accelerator position and vehicle speed will therefore be apparent.

When the valve actuator 144 is energized, the valve element 214 of the restraining unit 186 is shifted to the right as viewed in FIGURE 5, so as to disconnect the governor pressure line 192 and vent line 198. Accordingly, the vehicle speed influence is removed from all ratio shift valves to prevent any upshift to a higher ratio. Also, the line pressure conduit 184 is then connected to the conduit 190 to pressurize chamber 216. If the vehicle speed remains high, the valve element 218 will remain in its illustrated position because of the governor pressure in chamber 220 so that line pressure in conduit 190 is connected to conduit 222 for immediate forced downshift of the valve 166. If, on the other hand, the vehicle speed had been sufficiently reduced by venting of governor pressure line 198, the valve element 218 would shift to the right with the downshift line 222 disconnected from 190.

It will therefore be apparent, that the ratio shift valves of the type of control system illustrated in FIGURE 5 will be initially restrained by removal of the vehicle speed influence from the ratio shift valves which are then immediately and forcibly downshifted with a holding line pressure should the vehicle speed remain high.

Figure 8:
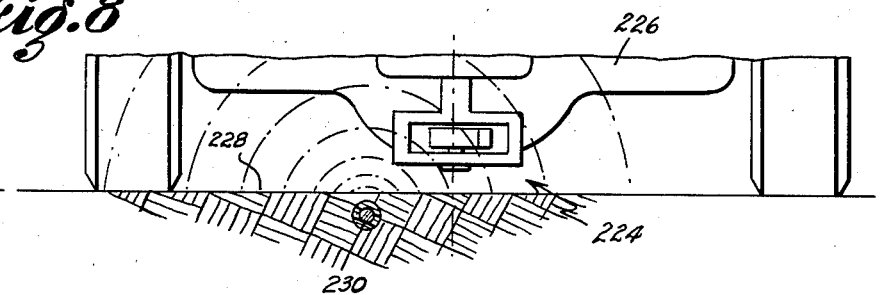
FIGURE 8 is a partial rear-end view of a typical receiver unit vehicle installation.
Figure 11:
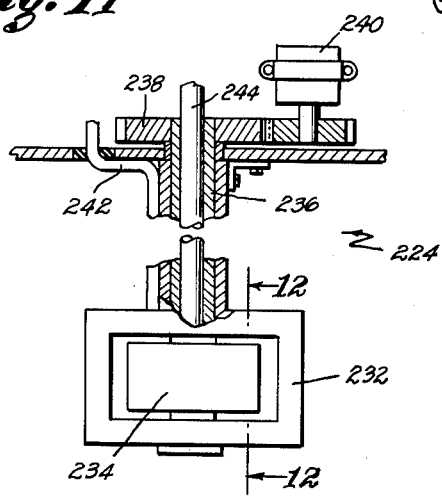
FIGURE 11 is an enlarged partial sectional view of the signal receiver.
Figure 12:
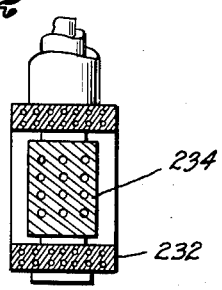
FIGURE 12 is a sectional view taken substantially through a plane indicated by section line 12—12 in FIGURE 11.

FIGURE 8 illustrates one exemplary installation of a signal receiving apparatus by means of which the valve actuator mechanism 144 as previously mentioned is energized. A signal receiving assembly generally referred by reference numeral 224 is mounted below the vehicle 226 between the tires thereof in spaced relation above the road surface 228. Accordingly, an electric conductor 230 is imbedded in the road adjacent the surface thereof, through which current is passed of such magnitude as to provide the requisite restraining signal by creating a magnetic field thereabove of such flux density that the receiving assembly will have induced therein a signal current reflecting both deviations from the lane because of a decreasing flux density from the lane center and vehicle speed because of the rate of cutting of the lines of flux or movement of the receiver assembly through the magnetic field. As more clearly seen in FIGURES 11 and 12, the assembly 224 includes an outer coil member 232 which is fixed and positioned for movement with the vehicle perpendicular to the magnetic fields created about the conductor 230. Rotatably mounted within the outer coil member is an inner coil member 234 connected to a hollow shaft 236 to which gear 238 is connected. A low speed orientation control motor 240 is therefore geared to the shaft 236 through gear 238 for variably positioning the inner coil member so as to vary the current induced therein by movement of the coil member 234 through the magnetic field. Electric cables 242 and 244 are therefore connected to the respective coil members through which the signal currents are transmitted to a suitable control unit for issuing an energizing signal to the actuator 144.

Figure 6:
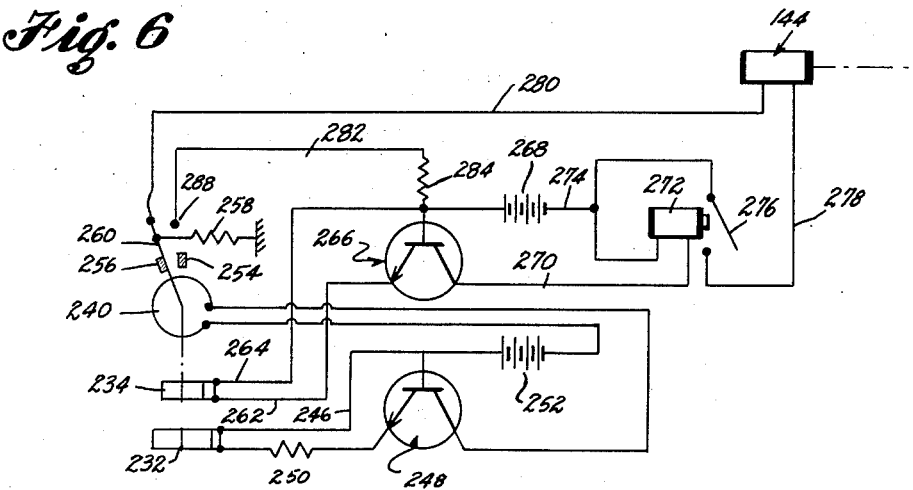
FIGURE 6 is an electrical circuit diagram of one form of external signal receiver unit.

The control circuit associated with the exemplary receiver assembly is illustrated in FIGURE 6. It will be observed therein that one terminal of the outer coil member 232 is connected by conductor 246 to the base of the transistor 248, while the other terminal is connected through resistor 250 to the emitter. When a signal current of sufficient magnitude is induced in the coil member 232, the transistor 248 will be rendered conductive so as to close a circuit from the source of current 252 through the base and collector to one terminal of the orientation control motor 240, the other terminal thereof being connected to the battery source 252. The motor 240 is accordingly energized to move from limit stop 254 to stop 256 against the bias of spring 258 connected to a motor switch arm 260. The inner coil member 234 is thereby positioned between a maximum and minimum signal current inducing position.

The inner coil member is connected by conductors 262 and 264 to the emitter and base respectively of the transistor 266. A signal current of sufficient magnitude will accordingly render the transistor 266 conductive so as to close a circuit from battery 268 to the base, through the collector, conductor 270, relay 272 and conductor 274. The relay will therefore be energized to operate switch 276, closing a circuit from battery 268, through conductors 274 and 278, actuator 144, conductors 280 and 282 and resistor 284 when the switch 260 engages contact 286.

Operation of the control signal circuit will be as follows: When the vehicle is stationary, no current will be induced in either coil member 232 or 234 so that the actuator 144 is inoperative under all conditions. If the vehicle is moving at a high cruising speed within its lane, a relatively high signal current will be induced in the fixed coil member 232 so as to render the transistor 248 conductive. The motor 240 is therefore energized so as to move the coil member 234 to a reduced signal current inducing position and also closing switch 260. If the high cruising speed were above the prescribed speed limit which may be regulated by the authorities by control of the current in the road conductor 230, then the induced current in coil 234 would still be sufficient to also render transistor 266 conductive energizing relay 272 to close a circuit through the actuator 144. The actuator will then be operative to apply the restraining influence on the transmission as hereinbefore described. If, on the other hand, the vehicle speed is below the speed limit, the induced current in coil 234 would not be sufficient to render the actuator operative.

When the vehicle is moving off its lane by a dangerous amount, the fixed coil 232 will not have induced therein sufficient current to render the transistor 248 conductive and energize motor 240. If the speed of the vehicle is very low so as to reduce the danger, the coil 234 which is then biased to its maximum current inducing position will not have sufficient current induced therein to render the actutaor 144 operative. However, if the speed is too high the transistor 266 would be rendered conductive and the actuator 144 operative. Thus, at cruising speeds below the externally prescribed speed limit, the need signal intensity in fixed coil 232 would never be sufficient in itself to produce restraining control operation since it would be sufficient to effect displacement of movable coil 234 from a maximum current inducing position if the vehicle is moving in the externally prescribed path. Should the vehicle deviate too much from its lane, the resulting reduction in speed signal intensity in the fixed coil 232 would cause the movable coil 234 to be restored toward its maximum current inducing position so as to produce a lane deviation signal intensity sufficient to produce restraining control operation in conjunction with the reduced speed signal intensity at cruising speeds of the vehicle. Both increasing and decreasing signal intensities therefore affect restraining control operation dependent upon the prescribed safety condition being exceeded.

Figure 10:
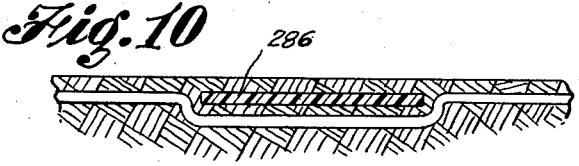
FIGURE 10 is a partial longitudinal section taken through a plane indicated by section line 10—10 in FIGURE 9.
Figure 9:
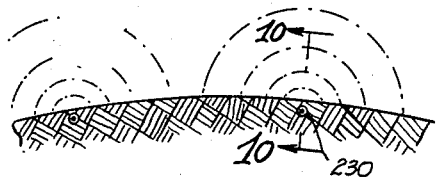
FIGURE 9 is a partial cross-sectional view of one form of two-lane highway signal generating arrangement.

It will therefore become apparent that the fixed coil 232 and movable coil 234 combined to provide a discriminating signal reflecting combination of speeds and deviations from the road lane considered dangerous. The highway lanes may therefore be arranged with respect to the road conductors 230 as seen for example in FIGURE 9, to restrain lane hopping and wavy driving in addition to speeding. Also, as seen in FIGURE 10, marked road sections may be provided with conductor shielding 286 so as to permit unrestrained lane crossing where desirable or necessary.

From the foregoing, it will be appreciated that roads may be constructed with very little additional expense in order to install the system of the present invention. Also, a regulated restraining control may be exercized by the authorities but will have little or no affect on vehicles driven properly or within prescribed safety ranges. Also, should a driver deviate from the safe conditions, a non-disturbing restraint will be applied indirectly. Finally, modification of present vehicles for operation within the system will involve little effort and expense without in any way affecting use of the vehicle outside of the system.

I claim:

1. In a vehicle having a throttle controlled engine, a transmission driven by the engine adapted to be influenced by means producing influences prescribed externally of the vehicle comprising, plural ratio drive means, drive ratio control means operatively connected to the plural ratio drive means for varying the drive ratio thereof, internal engine and transmission condition responsive means operatively connected to the drive ratio control means for varying the drive ratio of the plural ratio drive means in accordance with engine and transmission conditions and external signal responsive means operatively connected to the drive ratio control means independent of the engine and transmission condition responsive means for varying the transmission ratio in accordance with said externally prescribed influences jointly with the drive ratio control means.

2. The combination of claim 1, where the external signal responsive means includes signal receiving means for receiving radiant energy generated externally of the vehicle by said means producing externally prescribed influences, positioning means operatively connected to the receiving means tending to position the receiving means for reception of said radiant energy at maximum intensity, relay means operatively connected to the receiving means and operative in response to reception of a signal within a predetermined intensity range, and restraining control means operatively connected to the drive ratio control means and responsive to operation of the relay means to progressively reduce the drive ratio of the plural ratio drive means.

3. The combination of claim 2, wherein said signal receiving means comprises signal current inducing means mounted on the vehicle in the field of said radiant energy for generating guided energy varying in magnitude in accordance with rate of movement of the vehicle and the signal current inducing means through said radiant energy.

4. The combination of claim 3, wherein said restraining control means includes ratio upshift disabling means and forced downshift control means rendered sequentially operative by the relay means.

5. The combination of claim 1, wherein said plural ratio drive means includes hydrodynamic means, torque control means operatively connected to the hydrodynamic means for varying the torque ratio characteristics thereof, and means operatively connected to the torque ratio control means and responsive to the external signal means for varying the torque ratio of the hydrodynamic means.

6. The combination of claim 5, wherein the plural ratio drive means further includes variable ratio gear means driven by the hydrodynamic means and responsive to the torque output thereof and load on the transmission to change the drive ratio, and said external signal responsive means includes means operatively connected to the gear means for conditioning the gear means for a low drive ratio.

7. The combination of claim 1, wherein said plural ratio drive means comprises, a hydrodynamic torque converter having a plurality of turbine elements, reduced ratio drive gear means having a plurality of drivingly interconnected input members and a single output member, said turbine elements being respectively connected to the input members, and output member, one-way brake means operatively connected to one of the input members for initially conditioning the reduced drive gear means for low ratio drive, overdrive gear means having drivingly interconnected input, output and control elements, said input element being connected to said one of the input members, said output element being connected to the output member and a one-way brake mechanism operatively connected to the control element for automatically rendering the overdrive gear means operative in response to a predetermined drive ratio between said output member and said one input member.

8. An automatically controlled transmission having a plurality of reduced forward drive ratios and an overdrive ratio comprising a hydrodynamic torque converter having a plurality of turbine elements, reduced ratio drive gear means having a plurality of drivingly interconnected input members and a single output member, said turbine elements being respectively connected to the input members, and output member, one-way brake means operatively connected to one of the input members for initially conditioning the reduced drive gear means for low ratio drive, overdrive gear means having drivingly interconnected input, output and control elements, said input element being connected to said one of the input members, said output element being connected to the output member and a one-way brake mechanism operatively connected to the control element for automatically rendering the overdrive gear means operative in response to a predetermined drive ratio between said output member and said one input member.

9. The combination of claim 8, including reverse drive control means operatively connected to one of the turbine elements and another of the input members to cause reverse rotation of at least one other turbine element and simultaneously conditions the reduced drive gear means for reduce drive therethrough.

10. The combination of claim 8, wherein the control element of the overdrive gear means is a ring gear.

11. The combination of claim 10, wherein said reduced drive gear means includes two input gear members.

12. The combination of claim 8, wherein said reduced drive gear means includes two input gear members.

13. The combination of claim 1, wherein said drive ratio control means includes ratio shift control means operatively connected to said internal condition responsive means for variable control of the ratio shift control means, disabling means responsive to the external signal responsive means for disconnecting the condition responsive means from the ratio shift control means for downshift thereof, or to prevent upshift thereof and forced downshift means responsive to operation of the disabling means above a predetermined vehicle speed to further downshift the ratio shift control means.

14. The combination of claim 13, wherein said disabling means comprises an upshift disabling valve through which the condition responsive means is operatively connected to the ratio shift control means, said disabling valve when actuated admitting control pressure to the forced downshift means.

15. In a vehicle having a transmission adapted to be affected by means disposed externally of the vehicle, internally responsive control means operatively connected to the transmission for varying the ratio thereof during drive through said transmission, and safety means operatively connected to the transmission independent of the control means for progressively modifying said variation in transmission ratio in response to a signal continuously generated external to the vehicle by said means disposed externally of the vehicle.

16. The combination of claim 15 wherein said safety means includes signal receiving means rendered operative when the vehicle speed is in excess of a predetermined value.

17. In a vehicle having a transmission adapted to be affected by means disposed externally of the vehicle for prescribing a plurality of safe operating conditions, internally responsive control means operatively connected to the transmission for drive ratio variation thereof in accordance with conditions exclusive of said plurality of externally prescribed safe operating conditions, and safety means operatively connected to the transmission independent of the internally responsive control means for progressively modifying said drive ratio variation of the transmission in response to a signal continuously generated by said means disposed externally of the vehicle, said safety means including signal receiving means rendered operative when the vehicle speed exceeds a predetermined value reflecting one of said externally prescribed safe operating conditions and means for rendering the safety means operative in response to reduction in the intensity of the generated signal below a predetermined amount for detecting deviations from an externally prescribed path reflecting another of said plurality of safe operating conditions.

References Cited in the file of this patent

UNITED STATES PATENTS

| | | |
|---|---|---|
| 2,205,794 | Jandasek | June 25, 1940 |
| 2,842,039 | Swingle | July 8, 1958 |
| 2,847,080 | Zworykin et al. | Aug. 12, 1958 |
| 2,964,975 | De Lorean | Dec. 20, 1960 |
| 3,018,368 | Mountjoy | Jan. 23, 1962 |
| 3,021,727 | Kelley et al. | Feb. 20, 1962 |
| 3,029,893 | Mountjoy | Apr. 17, 1962 |